United States Patent
Brooker

(10) Patent No.: US 7,170,675 B2
(45) Date of Patent: Jan. 30, 2007

(54) METHOD AND SYSTEM FOR WIDE-FIELD MULTI-PHOTON MICROSCOPY HAVING A CONFOCAL EXCITATION PLANE

(75) Inventor: Gary Brooker, Rockville, MD (US)

(73) Assignee: CellOptic, Inc., Rockville, MD (US)

( * ) Notice: Subject to any disclaimer, the term of this patent is extended or adjusted under 35 U.S.C. 154(b) by 222 days.

(21) Appl. No.: 10/847,862

(22) Filed: May 19, 2004

(65) Prior Publication Data

US 2005/0259319 A1 Nov. 24, 2005

(51) Int. Cl.
  *G02B 21/00* (2006.01)
  *G02B 21/06* (2006.01)
(52) U.S. Cl. .................................. 359/385; 250/458.1
(58) Field of Classification Search ................ 359/385, 359/389; 250/458.1
  See application file for complete search history.

(56) References Cited

U.S. PATENT DOCUMENTS

| | | | |
|---|---|---|---|
| 5,034,613 A * | 7/1991 | Denk et al. .............. | 250/458.1 |
| 6,262,423 B1 | 7/2001 | Hell et al. | |
| 6,344,653 B1 | 2/2002 | Webb et al. | |
| 6,400,487 B1 * | 6/2002 | Harris et al. ................ | 359/210 |
| 6,677,596 B2 | 1/2004 | Engelhardt et al. | |
| 6,751,016 B2 * | 6/2004 | Fukuyama et al. ......... | 359/368 |
| 6,998,214 B2 * | 2/2006 | Fourkas et al. ............. | 430/269 |
| 2003/0063379 A1 | 4/2003 | Fukuyama et al. | |
| 2005/0024720 A1 * | 2/2005 | Cartlidge et al. ........... | 359/368 |

OTHER PUBLICATIONS

"Advances in multiphoton imaging"; A. Krueger, American Laboratory, pp. 36-39, Apr. 2000.

"Widefield multiphoton and temporally decorrelated multifocal multiphoton microscopy", David N. Fittinghoff, et al., Optics Express, vol. 7, No. 8, pp. 273-279, Oct. 9, 2000.

"Real-Time Two-Photon Microscopy and Its Application for In Situ Imaging", Tomoyuki Kaneko et al., Acta Histochem. Cytochem. 34 (6); pp. 399-403, 2001.

"The Diversification of Ultrafast Lasers", A. Krueger, Photonics Tech Briefs, Oct. 2001.

"Multifocal multiphoton microscopy", J. Bewersdorf et al., Optics Letters, vol. 29, No. 9, pp. 655-657, May 1, 1998.

* cited by examiner

*Primary Examiner*—Mark A. Robinson
(74) *Attorney, Agent, or Firm*—Oblon, Spivak, McClelland, Maier & Neustadt, P.C.

(57) ABSTRACT

According to one aspect of the invention, a wide-field microscope includes a stage configured to hold a specimen having a fluorescent material therein, and a multi-photon excitation light source configured to produce a substantially parallel beam of excitation light having a single photon energy less than an absorption energy required for single photon excitation of the fluorescent material. An infinity corrected objective is optically coupled to the multi-photon excitation light source and configured to focus the substantially parallel beam of excitation light onto the specimen such that multi-photon excitation of the fluorescent material simultaneously occurs over a predetermined area of the specimen. A focus lens is configured to focus emission light emitted from the predetermined area of the specimen onto at least two pixels of an image detector simultaneously. A focus lens is configured to focus emission light emitted from the predetermined area of the specimen onto an image plane, such that the image plane can be viewed through a binocular eyepiece or an imaging array detector.

75 Claims, 7 Drawing Sheets

METHOD AND SYSTEM FOR WIDE-FIELD MULTI-PHOTON MICROSCOPY HAVING A CONFOCAL EXCITATION PLANE

BACKGROUND OF THE INVENTION

1. Field of the Invention

The present invention relates generally to fluorescence microscopy, and more specifically to providing wide field multi-photon excitation in a confocal plane.

2. Discussion of the Background

Optical microscopy has long been used for inspecting objects too small to be seen distinctly by the unaided eye. Optical microscopy involves providing a light beam incident on a specimen and viewing the light from the specimen through a magnifying lens. Fluorescence microscopy is another type of microscopy in which a fluorescent material is used to mark the specimen of interest, which is then illuminated with a wavelength of light that provides a single photon energy level sufficient to excite the fluorescent material to emit emission light. The image of the specimen is detected by collecting the emission light rather than the excitation light. Fluorescence microscopy can be practiced as standard wide-field microscopy or confocal microscopy.

In wide-field fluorescence microscopy, an excitation light source, such as an arc lamp, provides a parallel or quasi-parallel excitation beam that is converged onto a desired focal plane of the specimen. The image at the focal plane results from all of the light encompassed by the point spread characteristic of a specific objective. Because the point spread function does not define a single plane of focus, excitation of the fluorescent material occurs above and below the desired focal plane and volume information of the specimen cannot be discerned. Computational methods commonly called deconvolution microscopy, which utilize a model of the objective's point spread function, can be used to calculate the light of a specific plane in the specimen from a stack of images taken at different planes of focus. This is done by accounting for the influence of light from each slice upon the other slices to approximate a confocal image slice of defined thickness. The performance of wide-field deconvolution confocal fluorescence microscopy can be similar to optical confocal microscopic methods, however in many cases the resultant image is distorted because of the influence of image noise due to poor contrast caused by background emissions or because the point spread function for the objective may deviate from its respective model under actual experimental conditions. Moreover, these problems make 3-D representations of the specimen difficult to construct.

In confocal fluorescence microscopy, a beam of excitation light is focused on a focal point of the specimen. Where the excitation light has a wavelength sufficient to provide single photon excitation of the fluorescent material, excitation occurs in an hourglass beam waist centered at the focal point which approximates the point spread function of the objective. Unlike wide-field fluorescence microscopy, however, confocality can be obtained by using a pinhole aperture for the excitation source and emission image. Since only parallel light rays that originate from the plane of focus can pass through the pinhole, photons that do not have parallel rays (and are out of the plane of focus) are blocked by the pinhole aperture and do not reach the detector. Thus, the pinhole aperture blocks emission light from above and below the focus point thereby providing a clear image undistorted by information above and below the plane of focus. However, because the emission pinhole provides image data only from the point of focus of the laser beam, the excitation laser beam of a confocal system must be raster scanned in the x and y direction upon the sample and the fluorescent emission intensity collected at each x,y position. From this data an image slice of the specimen can be constructed in a computer. By changing the plane of focus, several images can be obtained and the resulting stack of images can be reconstructed in a computer to obtain a three dimensional (3-D) representation of the specimen.

One common problem with both wide-field and confocal fluorescence microscopy is that single photon excitation of the fluorescent material occurs above and below the point of focus where image of data is actually collected. This unnecessary excitation causes "bleaching" of the material above and below a particular focal plane which when subsequently excited as part of a new focal plane will have reduced emission characteristics. Moreover repeated excitation of tissue above and below the focal plane can damage the tissue, which is particularly undesirable for image creation of live specimens.

Recently, multi-photon fluorescence microscopy has emerged as a new optical sectioning technique for reducing the problems of bleaching and tissue damage. This type of microscopy uses a pulsed illumination laser source having a longer wavelength than required for excitation of the fluorescent material. For example, a dye requiring an excitation wavelength of 500 nm will be illuminated by a laser source operating at 1000 nm such that single photon excitation does not occur in the specimen since the dye does not absorb light at 1000 nm. However, use of a pulsed high-power excitation laser provides a sufficiently high photon density at the point of focus for at least two photons to be absorbed (essentially simultaneously) by the fluorescent material. This absorption of two photons of long wavelength provides excitation energy equivalent to the absorption of a single photon of a shorter wavelength and results in excitation confined to the focal point. Thus with multi-photon excitation, fluorescent material surrounding the focal point is not excited thereby eliminating the need for a pinhole aperture and minimizing problems of bleaching and tissue damage that occur from repeated excitation.

FIG. 6 shows a multi-photon scanning microscopy system disclosed in U.S. Pat. No. 5,034,613. As seen in this figure, the scanning microscope 10 includes an objective lens 12 for focusing incident light 14 from a source 16 such as a laser onto an object plane 18. The illumination provided by incident light beam 14 fills a converging cone generally indicated at 24, the cone passing into the specimen to reach the plane of focus at object plane 18 and form focal point 26. The optical path from laser 16 to the object plane 18 includes a dichroic mirror 28 onto which the light from the laser 16 is directed. The mirror 28 deflects this light downwardly to a mirror 30 which in turn directs the light to a pair of scanning mirrors 32 and 34 by way of curved mirrors 36 and 38. The mirrors 32 and 34 are rotatable about mutually perpendicular axes in order to move the incident light 14 along perpendicular X and Y axes on the object plane so that the stationary specimen is scanned by the incident beam. The light from the scanning mirrors passes through eyepiece 40 and is focused through the objective lens 12 to the object plane 18.

Fluorescence produced in the specimen in the object plane 18 travels back through the microscope 10, retracing the optical path of the incident beam 14, and thus passes through objective lens 12 and eyepiece 40, the scanning mirrors 34 and 32 and the curved mirrors 38 and 36, and is reflected by mirror 30 back to the dichroic mirror 28. The light emitted by fluorescent material in the specimen is at a wavelength that is specific to the fluorophore contained in the specimen, and thus is able to pass through the dichroic mirror 28, rather than being reflected back toward the laser 16, and follows the light path indicated generally at 44. The fluorescent light 42 thus passes through a barrier filter 46 and is reflected by flat mirrors 48, 50 and 52 to a suitable detector such as a photomultiplier tube 54. While not necessary for multi-photon microscopy, an adjustable confocal pin hole 56 is provided in the collection optics 44 to minimize background fluorescence excited in the converging and diverging cones above and below the plane of focus.

SUMMARY OF THE INVENTION

Despite the above described advantages of a multi-photon fluorescence microscopy system. The present inventor recognized that conventional systems of this type include complex and expensive excitation beam scanning mechanisms such as that shown in FIG. 8. Moreover, scanning of the focal point excitation light generally results in image acquisition speed that is too slow for video rate or higher speed imaging of the specimen.

Accordingly, one object of the present invention is to address the above described problems of prior art multi-photon fluorescence microscopy.

Another object of the present invention is to provide a method and system of multi-photon microscopy wherein scanning of the excitation light source over the specimen can be reduced or eliminated.

Yet another object of the invention is to reduce the image acquisition time for a specimen.

These and/or other objectives may be provided by a method and system for wide-field multi-photon microscopy having a confocal plane. According to one aspect of the invention, a wide-field microscope includes a stage configured to hold a specimen having a fluorescent material therein, and a multi-photon excitation light source configured to produce a substantially parallel beam of excitation light having a single photon energy less than an absorption energy required for single photon excitation of the fluorescent material. An infinity corrected objective is optically coupled to the multi-photon excitation light source and configured to focus the substantially parallel beam of excitation light onto the specimen such that multi-photon excitation of the fluorescent material simultaneously occurs over a predetermined area of the specimen. A focus lens is configured to focus emission light emitted from the predetermined area of the specimen onto at least two pixels of an image detector simultaneously.

According to another aspect, a wide-field microscope includes means for holding a specimen having a fluorescent material therein, and means for producing a substantially parallel beam of excitation light having a single photon energy less than an absorption energy required for single photon excitation of the fluorescent material included in the specimen. Also included in this aspect is means optically coupled to the multi-photon excitation light source for receiving the substantially parallel beam of excitation light and focusing the excitation light onto the specimen such that multi-photon excitation of the fluorescent material simultaneously occurs over a predetermined area of the specimen. Means for focusing focuses the emission light emitted from the predetermined area of the specimen onto at least two pixels of an image detector simultaneously.

Another aspect of the invention includes a method of providing a wide-field excitation across a confocal plane. The method includes holding a specimen having a fluorescent material therein, producing a substantially parallel beam of excitation light having a single photon energy less than an absorption energy required for single photon excitation of the fluorescent material included in the specimen, and applying a substantially parallel beam of excitation light to an infinity corrected objective that focuses the excitation light onto the specimen such that multi-photon excitation of the fluorescent material simultaneously occurs over a predetermined area of the specimen. Emission light emitted from the predetermined area of the specimen is focused onto at least two pixels of an image detector simultaneously.

Still another aspect of the invention includes a flexible microscope having a wide-field microscope. The wide-field microscope includes a stage configured to hold a specimen having a fluorescent material therein, and a multi-photon excitation light source configured to produce a substantially parallel beam of excitation light having a single photon energy less than an absorption energy required for single photon excitation of the fluorescent material. An infinity corrected objective is optically coupled to the multi-photon excitation light source and configured to focus the substantially parallel beam of excitation light onto the specimen such that multi-photon excitation of the fluorescent material simultaneously occurs over a predetermined area of the specimen. A focus lens is configured to focus emission light emitted from the predetermined area of the specimen onto at least two pixels of an image detector simultaneously. An optical fiber is coupled to the wide-field microscope, and an optical component holder is attached to an end of the optical fiber. At least the infinity corrected objective of the wide-field microscope is included in the optical component holder and all portions of the wide-field microscope not included in the optical component holder are included in an external unit optically coupled to an opposing end of the optical fiber.

Another aspect of the invention includes a wide-field microscope having a stage configured to hold a specimen having a fluorescent material therein, and a multi-photon excitation light source configured to produce a substantially parallel beam of excitation light having a single photon energy less than an absorption energy required for single photon excitation of the fluorescent material. An infinity corrected objective is optically coupled to the multi-photon excitation light source and configured to focus the substantially parallel beam of excitation light onto the specimen such that multi-photon excitation of the fluorescent material simultaneously occurs over a predetermined area of the specimen. A focus lens is configured to focus emission light emitted from the predetermined area of the specimen onto an image plane, such that the image plane can be viewed through a binocular eyepiece.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

As discussed above, conventional multi-photon fluorescence microscopy systems include scanning of the sample by the excitation light source. The present inventor recognized that the use of scanning in multi-photon microscopy is due to the widely perceived need to excite only a small focus point of the specimen. In conventional multi-photon microscopes, the small excitation area corresponds to a single pixel of the microscope detector so that the excitation beam must be scanned across the field of view, pixel by pixel. The perceived need for a small area multi-photon excitation region that is scanned across the specimen also prevents the use of image detection through a binocular eyepiece because a scanned image must be reconstructed by a computer before viewing. The present inventor has discovered, however, that the need for scanning of the excitation light source can be reduced or eliminated by simultaneous excitation of a larger area of the specimen. Such systems have been studied in an effort to provide efficient power use of ultra-short pulse excitation lasers used for multi-photon microscopy. For example, *Wide-field Multi-photon and Temporally Decorrelated Multifocal Multi-photon Microscopy*, by Fittinghoff, Wiseman and Squier, Optics Express, Vol. 7,273–280, 9 Oct. 2000 (hereinafter Fittinghoff et al.) discloses two systems that provide simultaneous excitation of a wide area of the specimen in order to allow efficient use of the excitation laser power.

Figure 7:
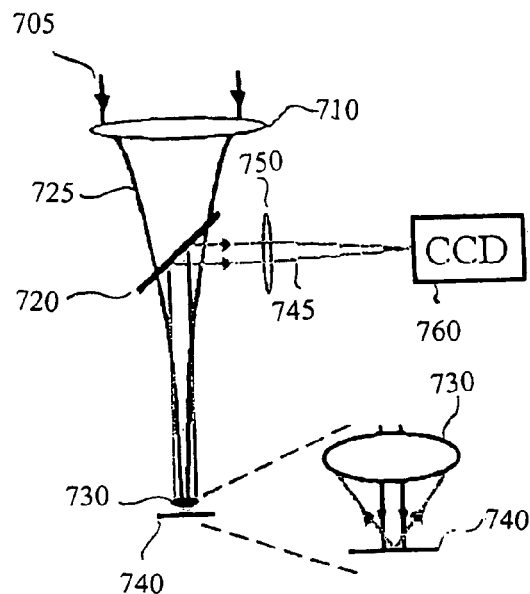
FIG. 7 is a system diagram of a wide-field multi-photon microscopy system in the prior art.

FIG. 7 shows a wide-field multi-photon microscope disclosed in Fittinghoff et al. As seen in this figure, an excitation beam 705 is focused by a focusing lens 710 and then passes through a dichroic mirror 720 and through the objective 730 which applies the excitation light to a focal plane of the specimen 740. The excitation beam 705 is provided by a 20 femtosecond, 800-nm pulsed laser source. A beam of light 745 emitted from the specimen passes back through the objective lens 730 and is reflected by the dichroic mirror 720 toward the tube lens 750. The tube lens 750 focuses the emission beam 745 on a charge coupled detector 760 to create an image. While the wide-field multi-photon microscope produces simultaneous excitation of a relatively large area of the specimen, the Fittinghoff et al. reference explains that the system has a poor axial resolution and therefore causes excitation of a much longer region of the sample in the axial direction. This causes a loss of confocality which, as with the wide-field microscopy system described in the Background above, results in poor images and inability to produce clean sectioning necessary for 3-D microscopy. Thus, Fittinghoff et al. indicates that wide-field multi-photon methods, while simultaneously exciting a large region, cannot provide a confocal excitation plane for clear slice and 3-D imaging.

Figure 8:
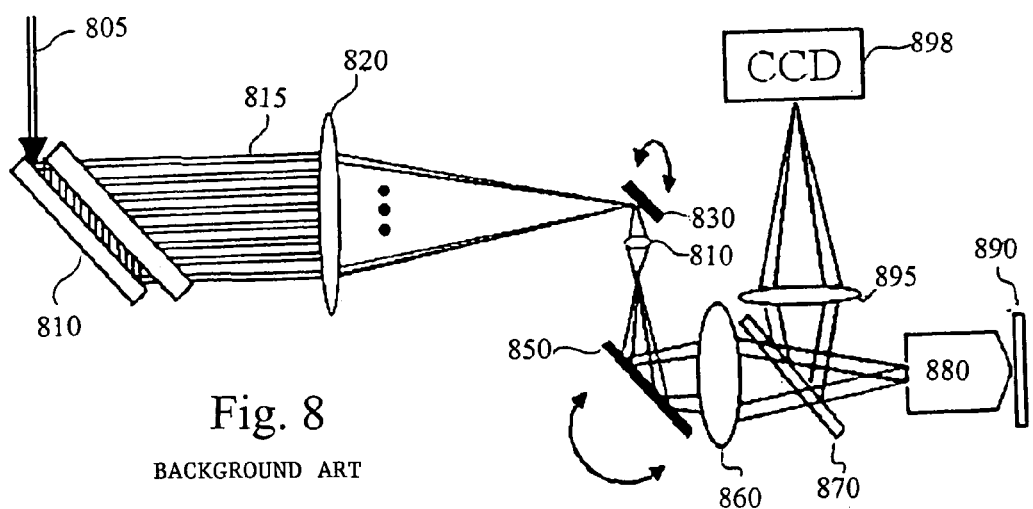
FIG. 8 is a system diagram of a decorrelated multifocal multi-photon system in the prior art.

FIG. 8 shows the decorrelated multifocal multi-photon system disclosed by Fittinghoff et al. for providing simultaneous excitation of a linear region of the sample while allowing 3-D imaging. As seen in this figure, a laser beam 805 is input to an etalon 810 that divides the beam into an array of individual focal beams 815 that are directed to the lens 820. The etalon 810 can be replaced by a series of beam splitters that divide the input laser beam into an array of equal power focal beams. The lens 820 then directs the multi-focal beam array 815 through first mirror 830, lens 840, second mirror 850 and to lens 860. As shown by the arrows in FIG. 8, mirrors 830 and 850 are movable in directions orthogonal to one another to provide scanning of the multifocal array. From the lens 860, the multifocal beam array passes through a dichroic mirror 870 to an objective lens 880 that applies the multifocal beam array to the sample on the stage 890 such that each beam of the array excites a small area of the specimen the size of a single pixel, for example. Light emissions from the sample are passed back through the objective 880 to the dichroic mirror 870, which reflects the emission light to lens 895 that focuses the emission light onto a charge coupled detector 898 individual pixels of which collect light from respective emission beams. While this use of a multifocal beam array provides improved axial resolution over the wide-field system of FIG. 7, the multifocal beam array must be scanned which is time consuming and requires complex and expensive scanning mechanisms discussed in the Background of the Invention section above. Moreover, complex optics are required to split the single beam of the light source into multiple parallel beams.

Thus, Fittinghoff et al., concludes that wide-field multi-photon microscopy lacks the inherent sectioning of standard multi-photon focus point scanning systems originally described in U.S. Pat. No. 5,034,613, but that scanning of an array of individual focused excitation beams can be used to provide clear image sectioning of a specimen. The present inventor has recognized, however, that the poor axial resolution and image distortion of the wide-field multi-photon microscopy system disclosed in Fittinghoff et al. is caused by spreading of the pulsed laser excitation beam. Specifically, pulse spreading reduces the photon density of the excitation light which results in reduced multi-photon excitation and loss of axial resolution of the excitation region. Having recognized this problem, the present inventor discovered that the undesirable pulse spreading is caused in the Fittinghoff et al. system of FIG. 7 by the excitation laser pulse beam passing through optical components prior to arriving at the objective lens.

Figure 6:
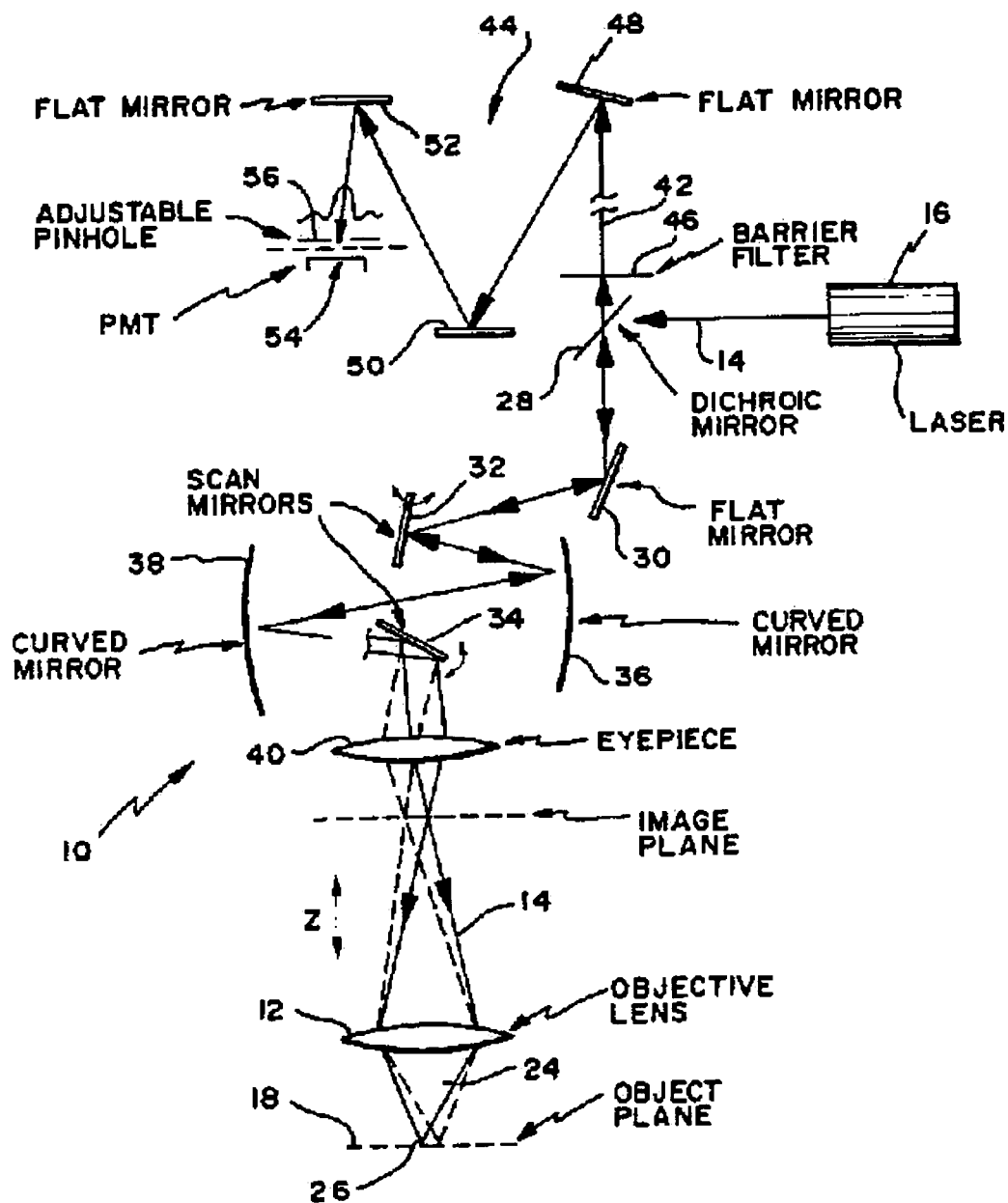
FIG. 6 shows a conventional multi-photon scanning microscopy system.

In particular the present inventor discovered that providing a focused excitation beam to the objective results in poor image slices provided by the system of FIG. 7. That is, the pulsed excitation laser beam passing through the focusing lens 710 of FIG. 7 prior to arriving at the objective causes pulse spreading of the pulsed beam due to dispersion characteristics of the lens and/or convergence of the beam. Similarly, the pulsed excitation laser beam passing through the dichroic mirror 620 in FIG. 6 also causes pulse spreading that leads to reduced axial resolution and distorted image slices. Moreover, the beam passing through the focus lens and mirror can cause attenuation of the excitation light, which further reduces multi-photon excitation of the focus plane. Having recognized these problems with the system of FIG. 7, the present inventor discovered that, contrary to the conclusion of the Fittinghoff et al. reference, a wide-field multi-photon microscopy system can achieve simultaneous excitation of a large area of the specimen while maintaining the axial resolution desired for clear image slices and 3-D microscopy.

Figure 1:
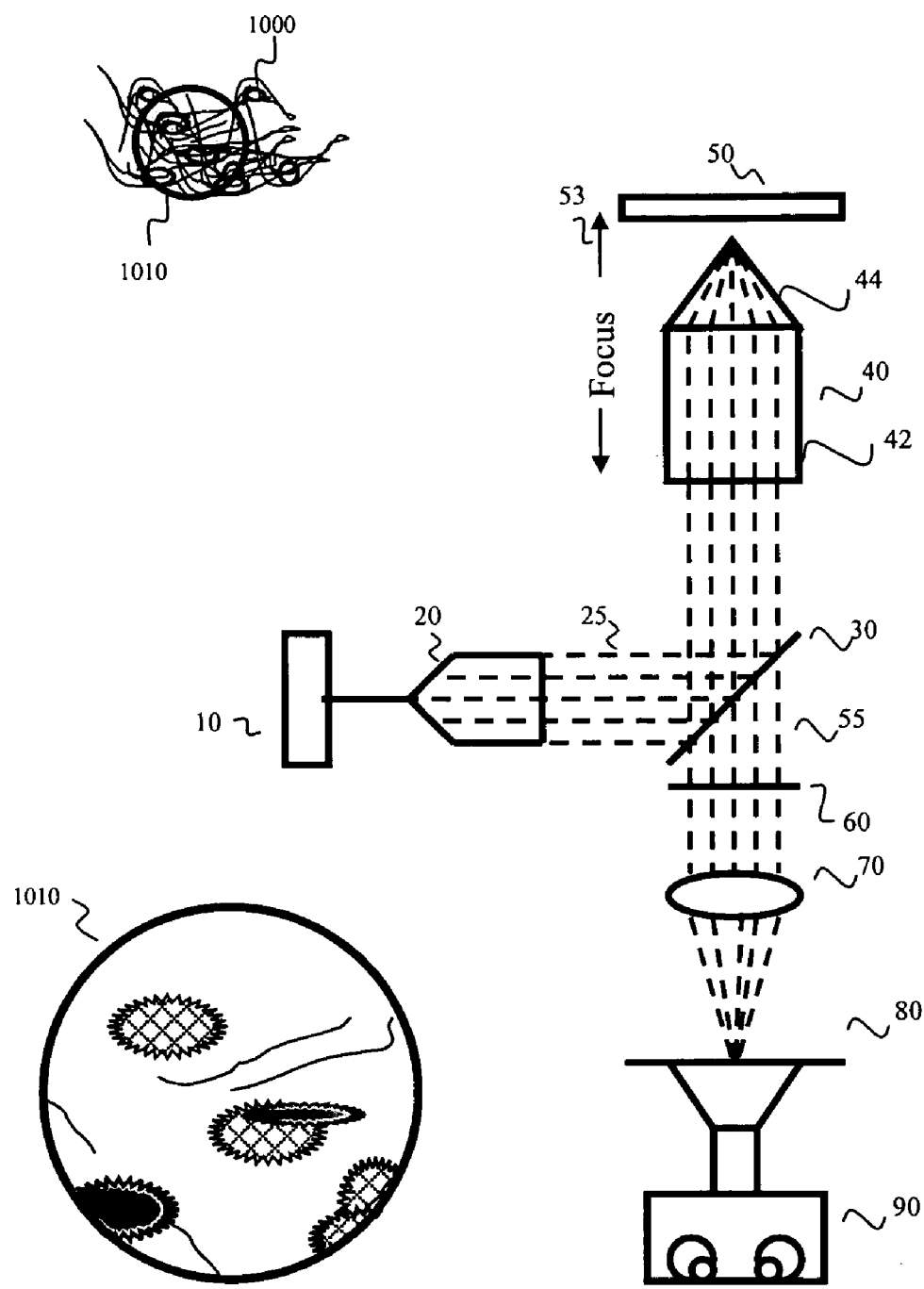
FIG. 1 is a system diagram of a multi-photon microscopy system in accordance with one embodiment of the invention.

Referring now to the remaining drawings, wherein like reference numerals designate identical or corresponding parts throughout the several views, FIG. 1 illustrates a wide-field multi-photon microscopy system according to one embodiment of the present invention. As seen in this figure, pulsed laser excitation source 10 provides an excitation light beam, which is expanded by the beam expander 20 into a substantially parallel excitation beam 25 that is applied to the dichroic mirror 30. Thus, in the embodiment of FIG. 1, the excitation light source 10 and the beam expander 20 function as a multi-photon excitation light source configured to produce a substantially parallel beam of excitation light. As would be understood by one of ordinary skill in the art, a variety of known configurations, such as the arc lamp of FIG. 2, can be used to provide a substantially parallel beam of excitation light.

The dichroic mirror 30 reflects the substantially parallel excitation beam 25 into the objective lens device 40, which applies the excitation light onto a specimen 1000 held on the stage 50. In the embodiment of FIG. 1, the objective 40 is movable along the axial direction of the excitation light beam to change the focus plane of the excitation light beam on the specimen 1000 as shown by arrow 53. The specimen absorbs at least 2 photons of the excitation light to cause the specimen to emit emission light which passes back through the objective 40, dichromic mirror 30 and emission filter 60 to tube lens 70. The tube lens 70 focuses the emission light 55 on an image plane 80 where detector 90 can detect an image 1010 of an area of the specimen 1000.

The pulsed laser excitation light source 10 provides ultra-short laser pulses of a predetermined wavelength having a single photon energy level insufficient to cause excitation of the specimen. As a wide variety of fluorescent material having different excitation characteristics can be added to a specimen, the operating wavelength of the laser excitation light source 10 depends on the fluorescence emission characteristics of the sample. Thus, the laser excitation light source 10 can operate at approximately 700 nm to approximately 1100 nm and is preferably tunable over this range. The short pulse of the laser excitation light source 10 may be in the picosecond, femtosecond or shorter pulse duration range, and may have a pulse repetition rate of up to 100 Mhz. In one embodiment, the laser excitation light source 10 can be implemented as a tunable titanium:sapphire mode-locked laser manufactured by Spectra-Physics of Mountain View Calif. However, any known laser for providing a short pulse excitation source for multi-photon excitation may be used.

As noted above, the beam expander 20 is configured to expand the excitation laser beam into a substantially parallel excitation light beam. As used herein, the term substantially parallel excitation light beam means that the beam is not passed through an optical device that is designed to converge rays of the beam. In one embodiment, the beam expander expands the pulsed excitation light beam up to 100 times its original beam width. The present inventor has recognized that such expansion of the laser can be accomplished while still allowing simultaneous multi-photon excitation across a plane of the specimen. Moreover, as discussed above, reduced pulse spreading and power loss help to preserve the multi-photon excitation characteristics of the laser beam. Thus, the beam expander 20 is preferably designed to provide reduced pulse spreading and power loss of the of the pulsed laser beam.

The beam expander is also preferably designed to provide a substantially uniform expanded beam with a homogeneous characteristics across the expanded beam area. Specifically, the pulse spreading of the pulsed excitation light source should be minimized and substantially constant across the area of the expanded beam. Similarly, the intensity of the excitation light should be substantially constant across the area of the expanded beam. The present inventor has recognized that this homogeneity can provide uniform multi-photon excitation characteristics across a wide field excitation area of the specimen. However, commercial beam expanders generally provide an expanded beam that has non-uniform pulse spreading and/or power loss across the beam area. Indeed, this may be a factor that has prevented the use of beam expanders to expand the pulsed laser source of a multi-photon excitation system.

Having recognized the importance of reduced pulse spreading and unform excitation beam characteristics to wide-field multi-photon microscopy, the present inventor has further recognized that the non-uniform expanded beam from commercial beam expanders is due to such beam expanders being designed such that different portions of the laser beam entering the beam expander travel through different amounts of the beam expander medium (for example, glass). More specifically, since pulse spreading and light attenuation are affected by the amount of medium that the laser beam must travel through, peripheral portions of the expanded beam, for example, may have different pulse spreading and attenuation characteristics than a center portion of the expanded beam. Thus, the beam expander of the present invention is specially designed to allow the laser beam to travel through substantially the same amount of glass (or other beam expander material) at each point of the expanded beam.

The substantially unfocused parallel excitation beam from the beam expander 20 is applied to dichroic mirror 30, which is designed to reflect a certain wavelength range and pass a different wavelength range. A characteristic of a multi-photon fluorescence microscopy system is that the excitation light has a substantially different wavelength than the wavelength of the fluorescent emission of the specimen. For example, the excitation wavelength is typically provided at approximately twice the wavelength (i.e. approximately one half the single photon energy) that is necessary for fluorescent emission of the specimen. When two or more excitation photons excite the specimen in a time period less than the characteristic decay time of the fluorescent material in the specimen, the specimen is excited to an energy level as if it were excited by a more energetic single photon, and therefore emits an emission photon whose wavelength is higher (lower energy) than the single photon excitation wavelength. The emission wavelength depends upon the physio-chemical characteristics of the fluorescent dye. Multi-photon excitation can be similarly achieved by use of 3 photon excitation wherein the excitation light is 3× the excitation wavelength. Greater multiples of the excitation wavelength may also be used to achieve higher multiples of multi-photon excitation.

Thus, in the embodiment of the invention shown in FIG. 1, the dichromic mirror 30 reflects the longer wavelength excitation light and passes the shorter wavelength emission light. Dichromic mirrors are well known to those skilled in the art of optical components. Moreover, any known optical component for achieving the same function of a dichroic mirror may be used in place of the mirror 30.

The objective 40 is an infinity corrected objective lens device having a rear lens portion 42 for receiving the substantially unfocused parallel excitation light beam from the dichroic mirror 30, and a front lens portion 44 for focusing the excitation beam onto a focus plane of the specimen. As with the beam expander 20 described above, the infinity corrected objective 40 is prefereably designed to provide minimal power attenuation and reduced spreading of the ultra-short excitation laser pulses. Moreover, the infinity corrected objective 40 can provide a wide variety of numerical aperture (NA) and magnification power characteristics. Table 1 provides a listing of exemplary NA and power characteristics that can be provided by the infinity corrected objective 40.

TABLE 1

| N/A | Mag. Power |
|---|---|
| .10 | 4 |
| .25 | 10 |
| .75 | 20 |
| .4 | 32 |
| 1.25 | 40 |
| 1.3 | 100 |
| 1.4 | 40, 60, 63, 100 |

As should be understood by one of ordinary skill in the art, other NA and magnification power lenses can be used to achieve the desired resolution and magnification for a particular application.

The front lens portion 44 of the infinity corrected objective 40 converges the excitation light onto a planar area such that sufficient photon density exists across a predetermined area of the focal plane to cause simultaneous multi-photon excitation of fluorescent material in a relatively large area corresponding to the predetermined area of the focal plane. Such a relatively large area allows viewing of an image through an optical detector such as a binocular eyepiece, for example. In addition simultaneous excitation of a large area of the specimen allows simultaneous detection of at least two pixels at the microscope image detector. Unlike the prior art wide-field multi-photon microscopy system described above, however, the embodiment of FIG. 1 provides the axial resolution desired for clear image slices, as will be described further below. Thus, the stage 50 that holds the specimen is preferably movable relative to the objective lens in an axial direction of the light beam as represented by the arrow 53 in the FIG. 1. This relative movement provides focusing of the excitation plane at different depths of the specimen so that 3-D imaging of the specimen can be performed.

The relative movement of stage 50 may be provided by moving the stage in an axial direction relative to a fixed objective 40, or moving the objective 40 relative to a fixed stage 50. Movement of both the stage 50 and objective 40 can also be provided. Moreover, movement of the stage 50 and/or objective can be provided by manual or automated movement configurations well known to those skilled in the art of microscopy. For example, axial movement can be provided by an electric motor and gear assembly, or a piezoelectric actuator assembly. This automated movement may be computer controlled as also know to those skilled in the art of microscopy.

Emission light collected from the predetermined excitation area of the specimen passes back through the front lens portion 44 of the infinity corrected objective 40 and exits the rear lens 42 portion as a substantially parallel beam directed toward the dichroic mirror 30. As noted above, the dichroic mirror 30 is designed to reflect the wavelength of the excitation light 25 and pass the wavelength of the emission light 55. Thus, the dichroic mirror 30 functions as a device for separating the emission light 55 from the excitation light 25. The emission filter 60 blocks wavelengths other than the emission wavelength, and the filtered parallel emission beam is then applied to the focusing lens 70. As the emission beam is substantially parallel, the focusing lens 70 is provided to converge the emission beam onto an image plane 80 so that an image of the specimen can be detected and viewed. The focusing lens may be a tube lens or any other known lens for focusing the parallel beam of emission light on an image plane 80. In the embodiment shown in FIG. 1, the image plane 80 corresponds to a detection device 90. The detection device 90 can be a simple optical detector such as the binocular eye piece shown in FIG. 1, a video camera, a cooled CCD camera, electron bombardment CCD camera or any other known device for detecting an image.

The wide-field multi-photon microscopy system of FIG. 1 provides simultaneous multi-photon excitation across a focal plane having improved axial resolution over prior art systems such as that shown in FIG. 7. As noted above, the present inventor recognized that the loss of axial resolution in the system of FIG. 7 was due to a focused excitation beam being applied to the objective lens. Thus, unlike the system of FIG. 7, the excitation beam of inventive FIG. 1 is applied to the objective 40 as a substantially parallel beam. In a preferred embodiment, the substantially parallel excitation beam is provided by expanding the beam width of a pulsed laser using a beam expander, which the present inventor recognized will still provide sufficient power for excitation across a relatively large area confocal plane. The application of a substantially parallel beam to the objective reduces pulse spreading of the excitation source which allows confocal excitation across a plane in the specimen. Reduction of pulse spreading is also provided by the excitation beam being reflected by the dichroic mirror 30 toward the objective rather than passed through the mirror as with the system of FIG. 7. Moreover, by eliminating 2 optical components that the excitation beam passes through (focus lens and dichroic mirror of FIG. 7), attenuation of the excitation light is reduced thereby allowing greater excitation of the specimen along the focus plane.

By providing a confocal plane of excitation, the wide-field microscopy system of the present invention reduces the need for scanning of the excitation beam. In a preferred embodiment the excitation plane cover the desired viewing area so that no scanning mechanism is needed at all, such as with the embodiment of FIG. 1. However, where the desired image viewing area is too large for simultaneous multi-photon excitation to take place, some scanning of the wide-field system in the xy direction can be used to provide improved images that are combined to provide an image slice covering of the desired area of the specimen. For example, it is sufficient that the simultaneous multi-photon excitation area of the specimen cover at least two pixel regions of the microscope detector. Where an optical detector such as a binocular eyepiece is used, it is sufficient that the simultaneous multi-photon excitation area cover an area that can be viewed by the user through the eyepiece. Adjustment of the simultaneous excitation area can be easily implemented by one of ordinary skill in the art. For example adjustment can be performed by changing the relative placement of the optical elements in the beam expander. In addition to reduced scanning, the present invention produces improved image slices due to improved contrast resulting from a reduction of background fluorescence, and further reduces the problems of bleaching and tissue damage over prior art wide-field systems.

Still further, the wide-field microscopy system of the present invention can provide improved image acquisition time. Specifically, the reduction or elimination of scanning of the excitation beam allows more time for exposure which results in a faster acquisition time. Moreover, although image acquisition time is related to the beam intensity at the focal point, which is distributed over a wide area for the wide-field system of the present invention, improvements in efficiency provided by the wide-field system may require none or small increases in the exposure time necessary for the wide area being simultaneously viewed. Specifically, the excitation light source of prior art focus point multi-photon microscopy systems is typically attenuated to avoid tissue damage of the specimen. The wide-field multi-photon microscopy system of the present invention can use the full power of the excitation light source and distribute this power over a large planar area so that the average power over the area is still below the threshold power for tissue damage. Thus, the exposure time for the larger area does not need to be increased over the time for conventional small area exposures because such small area exposures typically use an attenuated beam, which the present invention avoids.

Even assuming no efficiency improvements provided by the present invention, a reduced or non-scanning microscope of the invention will result in little or no increase in image acquisition time over that necessary using the current point scanning technique in which a higher power spot is scanned over the same area. For example, it may take 1 second to scan a 1000×1000 pixel image (each pixel is exposed for 1 microsecond) using a conventional scanning microscope. In the current invention the beam can be expanded to expose the whole 1000×1000 pixel image with a 1 second exposure time for collecting emission light. In this case with the expanded beam, each pixel sees 1,000,000 times less excitation energy, however the exposure time is increased 1,000,000 times, thus the net imaging result is the same.

Figure 2:
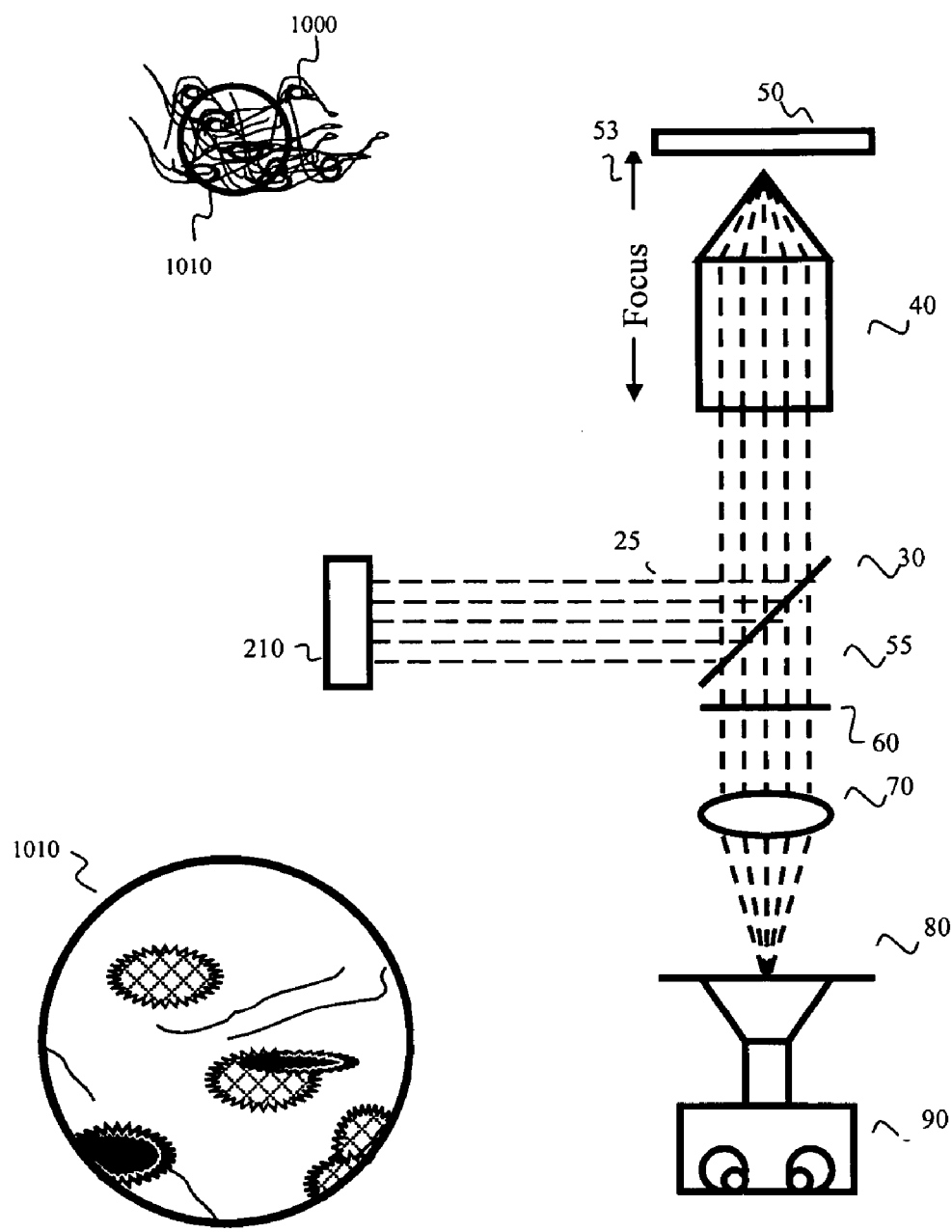
FIG. 2 is a system diagram of a multi-photon microscopy system in accordance with another embodiment of the invention.

FIG. 2 is a system diagram of a wide-field multi-photon microscopy system according to another embodiment of the present invention. In the embodiment of FIG. 2, the excitation light is provided by arc lamp 210. As with the laser source described in FIG. 1, the arc lamp 210 provides excitation light of a predetermined wavelength having a single photon energy level insufficient to cause excitation of the specimen. However, the arc lamp 210 produces a substantially unfocused parallel beam of excitation light having a wide beam width without the need for a beam expander. The arc lamp 210 is preferably a high power arc lamp that produces a substantially parallel beam having sufficient power to allow multi-photon excitation of the when the excitation beam is focused on a focus plane of the specimen. The substantially unfocused parallel beam of excitation light is applied to the specimen and emission light is collected from the specimen in the same way as the embodiment of FIG. 1 and therefore the discussion of the remaining optical components is not repeated.

Figure 3:
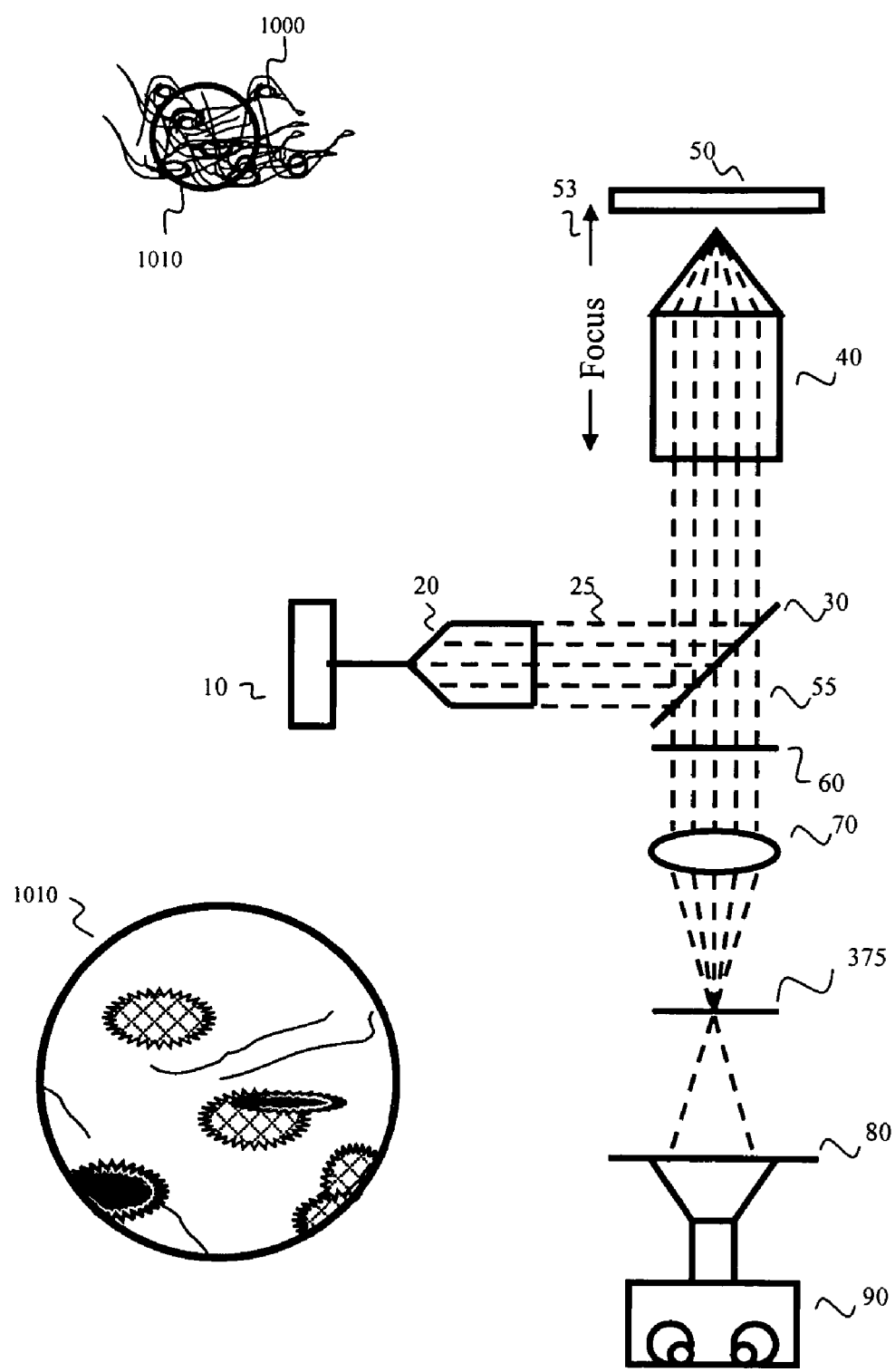
FIG. 3 is a system diagram of a multi-photon microscopy system in accordance with yet another embodiment of the invention.

FIG. 3 illustrates a wide-field multi-photon microscopy system according to another embodiment of the present invention. As seen in this figure, an embodiment of the invention includes a pinhole aperture 375 positioned in an intermediate image plane between the objective lens 70 and the image plane 80. The pinhole aperture 375 improves the confocality of the excitation plane so that clearer image slices and 3-D images of the specimen can be obtained. While shown in FIG. 3 in relation to an ultra-short pulse excitation source, the pinhole aperture 375 may be used with an arc lamp source such as that described with respect to FIG. 2. The pinhole aperture 375 may be implemented as a movable aperture that can be scanned in the xy directions. In another embodiment, the pinhole aperture 375 is implemented as a Nipkow Disc having a plurality of pinholes that scan the emission plane by rotation. Spinning Nipkow Discs and xy scanning pinhole apertures are well known to those skilled in the art of confocal microscopy. The substantially unfocused parallel beam of excitation light is applied to the specimen and emission light is collected from the specimen in the same way as the embodiment of FIG. 1 and therefore the discussion of the remaining optical components is not repeated.

Figure 4:
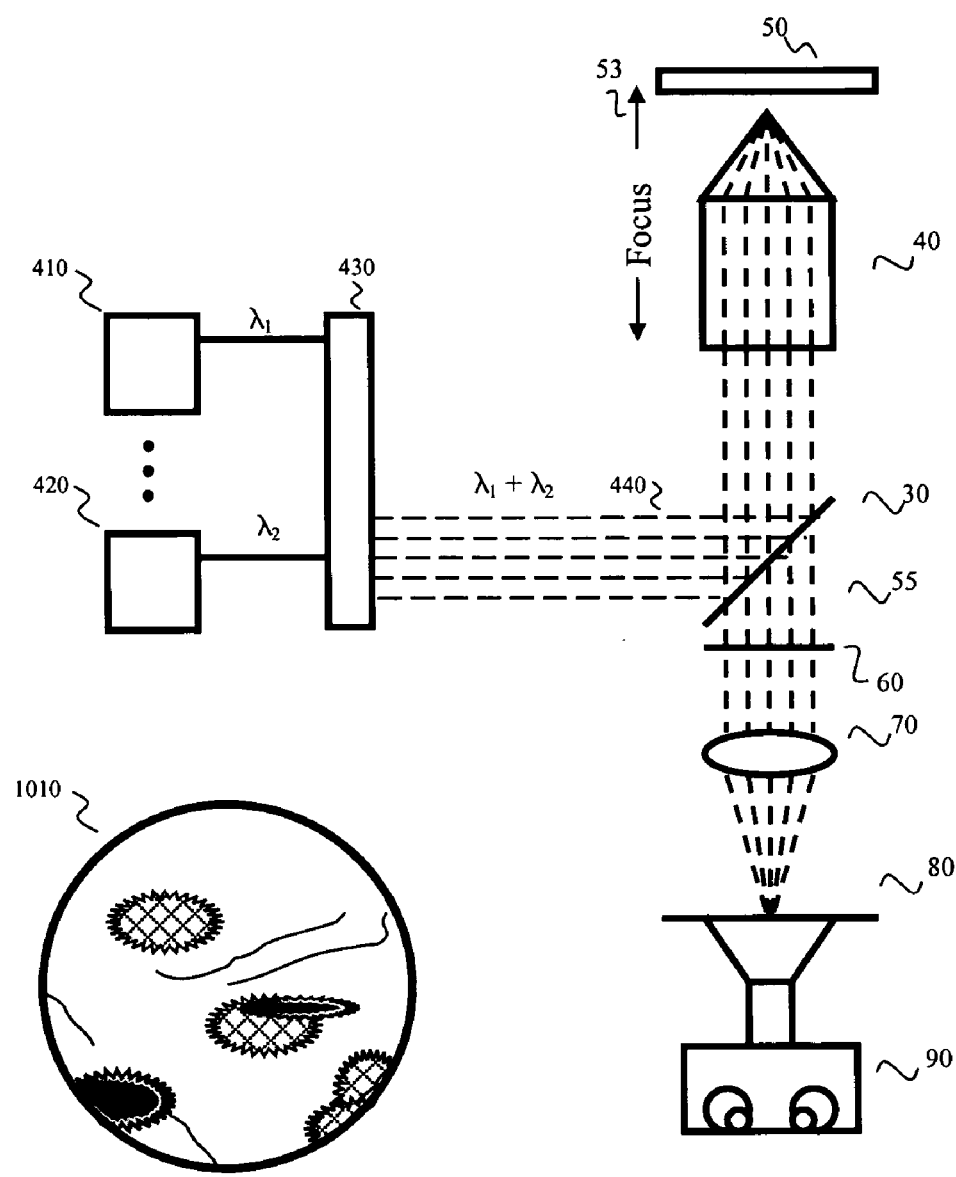
FIG. 4 is a system diagram of a multi-photon microscopy system in accordance with yet another embodiment of the invention.

FIG. 4 shows a wide-field multi-photon microscopy system in accordance with yet another embodiment of the present invention. In the embodiment of FIG. 4, excitation light is provided by two light sources 410 and 420 that produce excitation light having first and second wavelengths respectively. The light sources 410 and 420 may be implemented as the ultra-short pulse laser 10 described in FIG. 1, or the arc lamp 210 described in FIG. 2. Moreover, additional light sources having different wavelengths may be added to the system as represented by the ellipses in FIG. 4. The excitation light from the light sources 410 and 420 is combined by the beam combiner 430 into a single excitation light beam 440 having at least two wavelengths of excitation light. Thus, the system of FIG. 4 can be used for multi-fluorescent imaging in which laser pulses of different wavelengths are applied to a sample marked with different fluorescent materials having disparate emission characteristics.

The beam combiner includes optical components configured to superimpose the excitation light of the sources 410 and 420 upon one another. For example, the beam combiner may be a dichroic mirror that passes the first wavelength from the light source 410 which is axially aligned with the light beam 440, and reflects the second wavelength from the light source 420 which is positioned orthogonal to the axis of the light beam 440. Other known beam combiners can be implemented by one of ordinary skill in the art. As with the embodiments previously described, the excitation light beam 440 having at least two wavelengths is a substantially unfocused parallel beam. Thus, while not shown in FIG. 4, where the light sources are implemented as ultra-short pulse lasers, a beam expander is used to expand the beam as described with respect to FIG. 1.

The substantially unfocused parallel beam of excitation light is applied to the specimen through a substantially similar optical system as that described with respect to the embodiments of FIGS. 1–3. In the embodiment of FIG. 4, however, the specimen includes a fluorescent material corresponding to each of the wavelengths of the excitation beam. Therefore multi-photon excitation of different fluorescent materials in the specimen simultaneously occurs to provide different wavelength emission lights that serve to contrast different portions of the specimen. This emission light is collected by the objective and sent to the detector in substantially the same way as previously described. As would be understood by one of ordinary skill in the art, however, optical components such as the dichroic mirror of the embodiment of FIG. 4 must be designed to accommodate the range of wavelengths included in the excitation and emission light beams. Moreover, a pinhole aperture described in FIG. 3 may be implemented in the embodiment of FIG. 4.

The embodiments of the invention of FIGS. 1–4 have been described with respect to a microscope having an excitation source and a lens system positioned below the specimen on a stage. However, a wide-field multi-photon microscopy system of the present invention may be implemented as an upright microscope, which has the excitation system above the stage and the lens system above the stage. Moreover, the wide-field multi-photon microscopy system of the present invention may be implemented in conjunction with a focal point system. Specifically, a focused beam can be applied to the specimen and raster scanned for laser ablation, while a wide-field beam can be applied for multi-photon excitation and detection. Moreover, multiple wide-field excitation beams according to the present invention can be arranged in parallel in a configuration similar to the prior art system described with respect to FIG. 8. It is noted, however, that this implementation of the present invention does not need to scan the wide-field beam arrays. These systems can be readily implemented by one of ordinary skill in the art having the knowledge of the present invention as disclosed herein.

Figure 5:
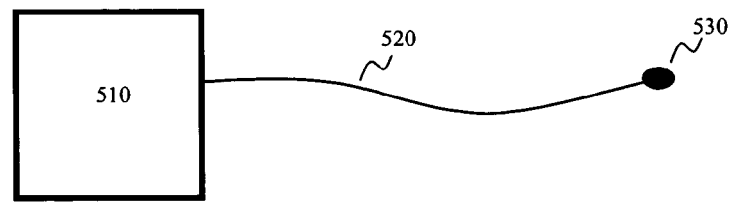
FIG. 5 is a system diagram of a flexible scope having a multi-photon microscopy system in accordance with the present invention.

Still further, the wide-field multi-photon microscopy system of the present invention may be implemented as a flexible scope used for example, in in vivo imaging. FIG. 5 illustrates a flexible scope utilizing the wide-field multi-photon excitation techniques of the present invention. As seen in this figure, the system includes an external unit 510 coupled to an optical fiber 520 having an objective 530 at a distal end of the fiber remote from the external unit. In a preferred embodiment, the objective 530 includes only a focusing lens corresponding to the front lens described with respect to FIG. 1. In this embodiment, the infinity corrected objective lens, tube lens, excitation light source as well as any other optical components are provided within the external unit 510. However, the infinity corrected lens and other optical components may be implemented into the objective lens unit of the fiber in order to reduce pulse spreading of the pulses excitation laser beam. Moreover, the optical fiber 520 may be implemented as a plurality of individual fibers, and may be enclosed in a catheter tube.

EXAMPLE PREFERRED EMBODIMENTS

Example 1

A Zeiss Axiovert 135 (Carl Zeiss, Germany) widefield microscope with motorized Z focus motor and epifluorescence equipment can be modified for 2-photon widefield fluorescence according to the present invention. The objectives include Zeiss 10×, 20×, 40×, 63× and 100× Plan-neofluar and Plan-Apcromats, with the NA of the objectives ranging from 0.4 to 1.4. One position in the fluorescence filter slider contains special filters to accommodate 2-photon excitation and emission. The dichroic mirror and excitation and emission filters contain no filter on the excitation side and a special dichroic mirror from Chroma Technology Corporation, Rockingham, Vt. which reflects light above 700 nm and passes wavelengths below 700 nm. Various bandpass emission filters between 450 nm and 700 nm can be used, depending upon the dye and wavelength of pulsed laser illumination. The arc lamp and the optical components in the epi-illumination path are removed and a SpectraPhysics (Mountain View, Calif.) tuneable MaiTai femtosecond laser, tuneable in the 700–1100 nm range, is substituted for the arc lamp illumination system.

A custom designed beam expander which maintains the coherence of the laser beam and uniformity of the femtosecond pulse width of the laser across the expanded beam is positioned between the output of the laser and the input to the microscope excitation path. A Hamamatsu (Japan) Orca-ER cooled CCD Camera is fitted on the microscope to record fluorescent images. Software such as Universal Imaging MetaMorph (Downingtown, Pa.) or Scanalytics IPLab (Fall Church, Va.) is used to control the focus on the microscope, the camera, and to acquire the images. A separate computer is used to control the MaiTai laser for selection of laser characteristics and wavelength of 2-photon excitation. The image acquisition software communicates with the computer controlling the MaiTai laser through a serial line to select the excitation wavelength.

Fluorescent images from live cells grown on 25 mm glass coverslips mounted in an Attofluor stainless steel coverslip holder (Molecular Probes, Eugene Oreg.) can be imaged with the 2-photon microscope. In the case of live cells, intracellular calcium, for example can be imaged in cells loaded with the ratio dye fura-2AM (excitation 705 nm and 760 nm, emission 500 nm–520 nm) or fluo-4AM (excitation 970 nm, emission 520 nm). Slides prepared from cultured cells and tissues sections from a variety of cell types and tissues can be imaged for specific antigens by reacting the slides with specific antisera and using fluorescently labeled second antibodies to detect the primary antibody on the slides. Secondary antibodies labeled with Alexa 350, Alexa 488 and Alexa 546 are used to detect the primary antibodies. These dyes can be excited separately or simultaneously with 700 nm, 976 nm and 1092 nm light from the femtosecond laser. A multibandpass emission filter (Chroma 61003m) was used to monitor the emission at each wavelength.

Example 2

A Pathway HT High Content Screening microscope (Atto Bioscience, Inc. can be modified for 2-photon widefield fluorescence according to the present invention. The objectives includes Zeiss 10×, 20×, 40×, 63× and 100× Plan-neofluar and Plan-Apcromats and Olympus 20×0.75 NA and 60×1.4 NA objectives. The dichroic mirror and excitation and emission filter wheels contained no filter on the excitation side and a special dichroic mirror from Chroma Technology Corporation, Rockingham, Vt. which reflects light above 700 nm and passes wavelengths below 700 nm. Various bandpass emission filters between 450 nm and 700 nm can be used, depending upon the dye and wavelength of pulsed laser illumination. The arc lamp and other optical components in the epi-illumination path for lamp two can be replaced with a SpectraPhysics (Mountain View, Calif.) tuneable MaiTai femtosecond laser, tuneable in the 700–1100 nm range.

A custom designed beam expander which maintained the coherence of the laser beam and uniformity of the femtosecond pulse width of the laser across the expanded beam is positioned between the output of the laser and the input to the microscope excitation path. A Hamamatsu (Japan) Orca-ER cooled CCD Camera in the instrument can record fluorescent images. Software inherent to the instrument is used to control the focus of the microscope, the objective position, the camera and to acquire the images. A separate computer is used to control the MaiTai laser for selection of laser characteristics and wavelength of 2-photon excitation. The image acquisition software communicates with the computer controlling the MaiTai laser through a serial line to select the excitation wavelength.

Fluorescent images from live cells grown on 25 mm glass coverslips mounted in an Attofluor stainless steel coverslip holder (Molecular Probes, Eugene Oreg.) can be imaged with the 2-photon microscope. In the case of live cells, intracellular calcium, for example can be imaged in cells loaded with the ratio dye fura-2AM (excitation 705 nm and 760 nm, emission 500 nm–520 nm) or fluo-4AM (excitation 970 nm, emission 520 nm). Fixed or living cells in multi-level plates labeled with fluorescent dyes can be monitored for their fluorescent emission by the present invention for high throughput or high content drug screening. Slides prepared from cultured cells and tissues sections from a variety of cell types and tissues can be imaged for specific antigens by reacting the slides with specific antisera and using fluorescently labeled second antibodies to detect the primary antibody on the slides. Secondary antibodies labeled with Alexa 350, Alexa 488 and Alexa 546 can be used to detect the primary antibodies. These dyes can be excited with 700 nm, 976 nm and 1092 nm light from the femtosecond laser. A multibandpass emission filter (Chroma 61003m) was used to monitor the emission at each wavelength.

Obviously, numerous modifications and variations of the present invention are possible in light of the above teachings. It is therefore to be understood that within the scope of the appended claims, the invention may be practiced otherwise than as specifically described herein.

The invention claimed is:

1. A wide-field microscope comprising:
 a stage configured to hold a specimen having a fluorescent material therein;
 a multi-photon excitation light source configured to produce a substantially parallel pulsed beam of excitation light having a single photon energy less than an absorption energy required for single photon excitation of said fluorescent material;
 an infinity corrected objective optically coupled to the multi-photon excitation light source and configured to focus the substantially parallel beam of excitation light onto the specimen such that multi-photon excitation of the fluorescent material simultaneously occurs over a predetermined area of the specimen corresponding to at least two pixels of an image detector of the wide-field microscope; and
 a focus lens configured to focus emission light emitted from said predetermined area of the specimen onto at least two pixels of the image detector simultaneously, wherein the excitation light source or the infinity corrected objective or both is configured to cause substantially homogeneous pulse spreading characteristics of the excitation light across the excitation light area when the excitation light passes therethrough.

2. The wide-field microscope of claim 1, wherein said microscope is not configured to scan the substantially parallel beam of excitation light in an x or y direction across the specimen.

3. The wide-field microscope of claim 2, further comprising a dichroic mirror configured to reflect the excitation light toward the infinity corrected objective lens and to pass the emission light through the dichroic mirror toward the focus lens.

4. The wide-field microscope of claim 3, wherein the dichroic mirror comprises a surface configured to reflect relatively long wavelength excitation light and pass therethrough shorter wavelength emission light.

5. The wide-field microscope of claim 3, further comprising an emission filter disposed in the optical path between the dichroic mirror and the focus lens.

6. The wide-field microscope of claim 1, further comprising:
 a movement system configured to adjust the distance between the infinity corrected objective lens and the specimen held on the stage.

7. The wide-field microscope of claim 6 wherein the stage is stationary and the objective lens device moves in any one or all of the X, Y, and Z dimensions.

8. The wide-field microscope of claim 6, wherein the objective lens device is stationary and the stage moves in any one or all of the X, Y, and Z dimensions.

9. The wide-field microscope of claim 6, wherein the movement system comprises a manual moving system.

10. The wide-field microscope of claim 6, wherein the movement system comprises a motorized moving system.

11. The wide-field microscope of claim 6, wherein the movement system comprises a computer controlled movement system.

12. The wide-field microscope of claim 6, wherein the movement system comprises a piezoelectric movement system.

13. The wide-field microscope of claim 1, wherein the image detecter comprises a video camera.

14. The wide-field microscope of claim 1, wherein the image detector comprises a cooled CCD camera.

15. The wide-field microscope of claim 1, wherein the image detector comprises an electron bombardment CCD camera.

16. The wide-field microscope of claim 1, wherein the multi-photon excitation light source comprises:
 a laser configured to emit the excitation light; and
 a beam expander configured to form the excitation light into the substantially parallel beam having a wider beam diameter than that provided by the laser.

17. The wide-field microscope of claim 16, wherein:
 the laser comprises a pulsed laser light source configured to provide a picosecond, femtosecond, or shorter pulse duration, and
 the beam expander is configured to provide substantially no pulse spreading of the pulsed laser light.

18. The wide-field microscope of claim 16, wherein:
 the laser comprises a pulsed laser light source configured to provide a picosecond, femtosecond, or shorter pulse duration, and
 the beam expander is configured to provide an expanded pulsed laser beam having substantially uniform characteristics across an area of the expanded pulsed laser beam.

19. The wide-field microscope of claim 18, wherein the beam expander is configured to present a substantially equal amount of beam expander medium to all light of the expanded beam.

20. The wide-field microscope of claim 16, wherein the beam expander is configured to expand a diameter of the laser beam 100 times.

21. The wide-field microscope of claim 16, wherein the laser comprises a tunable laser tunable between approximately 700 nm and approximately 1100 nm.

22. The wide-field microscope of claim 16, wherein the laser is configured to output light having a wavelength of 800 nm.

23. The wide-field microscope of claim 1, wherein the multi-photon excitation light source comprises an arc lamp having a wavelength output of between approximately 300 nm and 2000 nm.

24. The wide-field microscope of claim 23, wherein the arc lamp is tunable.

25. The wide-field microscope of claim 1, wherein the multi-photon excitation light source comprises:
   a first excitation light generator configured to generate excitation light having a first wavelength;
   a second excitation light generator configured to generate excitation light having a second wavelength; and
   a beam combiner configured to combine the excitation light of the first and second light generators into a substantially unfocused parallel beam of excitation light including the first and second wavelengths.

26. The wide-field microscope of claim 25, wherein the light generators comprise at least one of a pulsed laser and an arc lamp.

27. The wide-field microscope of claim 25, wherein the beam combiner comprises a dichroic mirror.

28. The wide-field microscope of claim 1, wherein the infinity corrected objective comprises:
   a front lens portion configured to focus a beam; and
   a rear lens portion configured to maintain a beam substantially parallel.

29. The wide-field microscope of claim 1, wherein the infinity corrected objective lens device comprises an objective having a magnification power of 4 and a numerical aperture (NA) of 0.10.

30. The wide-field microscope of claim 1, wherein the infinity corrected objective comprises an objective having a magnification power of 10 and a NA of 0.25.

31. The wide-field microscope of claim 1, wherein the infinity corrected objective comprises an objective having magnification power of 20 and a NA of 0.75.

32. The wide-field microscope of claim 1, wherein the infinity corrected objective comprises an objective having a magnification power of 32 and a NA of 0.40.

33. The wide-field microscope of claim 1, wherein the infinity corrected objective comprises an objective having a magnification power of 40 and a NA of 1.4.

34. The wide-field microscope of claim 1, wherein the infinity corrected objective comprises an objective having a magnification power of 40 and a NA of 1.25.

35. The wide-field microscope of claim 1, wherein the infinity corrected objective comprises an objective having a magnification power of 60 and a NA of 1.4.

36. The wide-field microscope of claim 1, wherein the infinity corrected objective comprises an objective having a magnification power of 63 and a NA of 1.4.

37. The wide-field microscope of claim 1, wherein the infinity corrected objective comprises an objective having a magnification power of 100 and a NA of 1.4

38. The wide-field microscope of claim 1, wherein the infinity corrected objective comprises an objective having a magnification power of 100 and a NA of 1.3.

39. The wide-field microscope of claim 1, wherein the system comprises an upright microscope or an inverted microscope.

40. The wide-field microscope of claim 1, wherein the multi-photon excitation light source is configured to produce a substantially unfocused parallel beam of excitation light having a photon energy that causes excitation of the specimen only when 2 or more photons are substantially simultaneously absorbed by the fluorescent material.

41. The wide-field microscope of claim 40, wherein the multi-photon excitation light source is configured to produce a substantially unfocused parallel beam of excitation light having a photon energy that causes excitation of the specimen only when 3 or more photons are substantially simultaneously absorbed by the fluorescent material.

42. The wide-field microscope of claim 1, further comprising a computer configured to combine multiple detected images into a three dimensional image of the specimen.

43. The wide-field microscope of claim 1, further comprising an adjustment device configured to adjust a beam width of said substantially parallel beam of excitation light.

44. The wide-field microscope of claim 43, wherein said adjustment device comprises a mechanism configured to change the relative placement of the optical elements in the beam expander.

45. A wide-field microscope comprising:
   means for holding a specimen having a fluorescent material therein;
   means for producing a substantially parallel pulsed beam of excitation light having a single photon energy less than an absorption energy required for single photon excitation of the fluorescent material included in the specimen;
   means optically coupled to the multi-photon excitation light source for receiving the substantially parallel beam of excitation light and focusing the excitation light onto the specimen such that multi-photon excitation of the fluorescent material simultaneously occurs over a predetermined area of the specimen corresponding to at least two pixels of an image detector of the wide-field microscope; and
   means for focusing emission light emitted from said predetermined area of the specimen onto at least two pixels of the image detector simultaneously, wherein the means for producing or the means optically coupled or both is configured to cause substantially homogeneous pulse spreading characteristics of the excitation light across the excitation light area when the excitation light passes therethrough.

46. The wide-field microscope of claim 45, further comprising means for reflecting the excitation light toward the infinity corrected objective lens and passing the emission light to the focus lens.

47. The wide-field microscope of claim 46, further comprising means for filtering the emission light, the means for filtering being disposed in the optical path between the means for reflecting and means for focusing.

48. The wide-field microscope of claim 45, further comprising:
   means for holding the specimen; and
   means for moving the specimen relative to the means for receiving the substantially unfocused parallel beam.

49. The wide-field microscope of claim 45, further comprising means for detecting an image focused on the image plane.

50. The wide-field microscope of claim 49, further comprising means for combining multiple detected images into a three dimensional image of the specimen.

51. A method of providing a wide-field excitation across a confocal plane, the method comprising:
   holding a specimen having a fluorescent material therein;
   producing a substantially parallel pulsed beam of excitation light having a single photon energy less than an absorption energy required for single photon excitation of the fluorescent material included in the specimen;
   applying a substantially parallel beam of excitation light to an infinity corrected objective that focuses the excitation light onto the specimen such that multi-photon excitation of the fluorescent material simultaneously occurs over a predetermined area of the specimen corresponding to at least two pixels of an image detector; and focusing emission light emitted from said predetermined area of the specimen onto at least two pixels of an image detector simultaneously, wherein at least one optical component fur producing a substantially parallel beam of excitation light and coupling the excitation light to the specimen is configured to cause substantially homogeneous pulse spreading characteristics of the excitation light across the excitation light area when the excitation light passes therethrough.

52. The method of claim 51, further comprising monitoring fixed or living cells in multi-well plates labeled with fluorescent dyes for fluorescent emission for high throughput or high content drug screening.

53. The method of claim 51, further comprising reflecting the excitation light toward the infinity corrected objective and passing the emission light to the focus lens.

54. The method of claim 51, further comprising focusing the emission light onto an image plane.

55. The method of claim 54, further comprising filtering the emission light at a converging point along the focused emission beam prior to the image plane.

56. The method of claim 54, further comprising focusing the confocal excitation plane by moving the specimen relative to the infinity corrected objective.

57. The method of claim 51, further comprising detecting an image focused on the image plane.

58. The method of claim 51, further comprising combining multiple detected images into a three dimensional image of the specimen.

59. A flexible microscope comprising:
a wide-field microscope comprising:
a stage configured to hold a specimen having a fluorescent material therein;
a multi-photon excitation light source configured to produce a substantially parallel pulsed beam of excitation light having a single photon energy less than an absorption energy required for single photon excitation of said fluorescent material;
an infinity corrected objective optically coupled to the multi-photon excitation light source and configured to focus the substantially parallel beam of excitation light onto the specimen such that multi-photon excitation of the fluorescent material simultaneously occurs over a predetermined area of the specimen corresponding to at least two pixels of an image detector of the wide field microscope;
a focus lens configured to focus emission light emitted from said predetermined area of the specimen onto at least two pixels of an image detector simultaneously, wherein the excitation light source or the infinity corrected objective or both is configured to cause substantially homogeneous pulse spreading characteristics of the excitation light across the excitation light area when the excitation light passes therethrough;
an optical fiber coupled to said wide-field microscope; and
an optical component holder attached to an end of said optical fiber, wherein at least said infinity corrected objective of the wide-field microscope is included in said optical component holder and all portions of the wide-field microscope not included in the optical component holder are included in an external unit optically coupled to an opposing end of said optical fiber.

60. A wide-field microscope comprising:
a stage configured to hold a specimen having a fluorescent material therein;
a multi-photon excitation light source configured to produce a substantially parallel pulsed beam of excitation light having a single photon energy less than an absorption energy required for single photon excitation of said fluorescent material;
an infinity corrected objective optically coupled to the multi-photon excitation light source and configured to focus the substantially parallel beam of excitation light onto the specimen such that multi-photon excitation of the fluorescent material simultaneously occurs over a predetermined area of the specimen corresponding to at least two pixels of an image detector of the wide-field microscope;
a focus lens configured to focus emission light emitted from said predetermined area of the specimen onto an image plane, wherein the excitation light source or the infinity corrected objective or both is configured to cause substantially homogeneous pulse spreading characteristics of the excitation light across the excitation light area when the excitation light passes therethrough; and
a binocular eye piece optically aligned with said image plane such that said image plane can be viewed through the binocular eyepiece.

61. A wide-field microscope comprising:
a stage configured to hold a specimen having a fluorescent material therein;
a multi-photon excitation light source configured to produce a substantially parallel pulsed beam of excitation light having a single photon energy less than an absorption energy required for single photon excitation of said fluorescent material;
an infinity corrected objective optically coupled to the multi-photon excitation light source and configured to focus the substantially parallel beam of excitation light onto the specimen such that multi-photon excitation of the fluorescent material simultaneously occurs over a predetermined area of the specimen corresponding to at least two pixels and the excitation light incident on the specimen has substantially uniform pulse spreading characteristics;
a focus lens configured to focus emission light emitted from said predetermined area of the specimen onto an image plane,
an imaging array detector optically aligned with said image plane such that said image plane can be viewed by the imaging array detector.

62. A wide-field microscope comprising:
a stage configured to hold a specimen having a fluorescent material therein;
a multi-photon excitation light source configured to produce a beam of excitation light with predetermined pulse spreading characteristics and having a single photon energy less than an absorption energy required for single photon excitation of said fluorescent material;
an infinity corrected objective optically coupled to the multi-photon excitation light source and configured to focus the beam of excitation light onto the specimen such that multi-photon excitation of the fluorescent material simultaneously occurs over a predetermined area of the specimen corresponding to at least two pixels of an image detector of the wide-field microscope; and
a focus lens configured to focus emission light emitted from said predetermined area of the specimen onto at least two pixels of an image detector simultaneously, wherein the excitation light source or the infinity corrected objective or both is configured to cause substantially homogeneous pulse spreading characteristics of the excitation light across the excitation light area when the excitation light passes therethrough.

63. The wide-field microscope of claim 62, wherein said predetermined pulse spreading characteristic is a reduced pulse speading.

64. The wide-field microscope of claim 62, wherein said predetermined pulse spreading characteristic is a uniform pulse spreading across an area of the excitation beam.

65. The wide-field microscope of claim 62, further comprising:
a movement system configured to adjust the distance between the infinity corrected objective lens and the specimen held on the stage.

66. The wide-field microscope of claim 62, wherein the multi-photon excitation light source comprises:
a laser configured to emit the excitation light; and
a beam expander configured to form the excitation light into the substantially parallel beam having a wider beam diameter than that provided by the laser.

67. The wide-field microscope of claim 66, wherein:
the laser comprises a pulsed laser light source configured to provide a picosecond, femtosecond, or shorter pulse duration, and the beam expander is configured to provide substantially no pulse spreading of the pulsed laser light.

68. The wide-field microscope of claim 66, wherein:
the laser comprises a pulsed laser light source configured to provide a picosecond, femtosecond, or shorter pulse duration, and the beam expander is configured to provide an expanded pulsed laser beam having substantially uniform characteristics across an area of the expanded pulsed laser beam.

69. The wide-field microscope of claim 68, wherein the beam expander is configured to present a substantially equal amount of beam expander medium to all light of the expanded beam.

70. The wide-field microscope of claim 66, wherein the beam expander is configured to expand a diameter of the laser beam 100 times.

71. The wide-field microscope of claim 62, wherein the multi-photon excitation light source comprises:
a first excitation light generator configured to generate excitation light having a first wavelength;
a second excitation light generator configured to generate excitation light having a second wavelength; and
a beam combiner configured to combine the excitation light of the first and second light generators into a substantially unfocused parallel beam of excitation light including the first and second wavelengths.

72. The wide-field microscope of claim 62, wherein the system comprises an upright microscope or an inverted microscope.

73. The wide-field microscope of claim 62, further comprising a computer configured to combine multiple detected images into a three dimensional image of the specimen.

74. The wide field microscope of claim 1 wherein:
the infinity corrected objective is configured to focus the substantially parallel beam of excitation light onto the specimen such that multi-photon excitation of the fluorescent material simultaneously occurs over a predetermined area of the specimen corresponding to at least a two by two pixel array of an image detector of the wide-field microscope; and
the focus lens is configured to focus emission light emitted from said predetermined area of the specimen onto the two by two pixel array of the image detector simultaneously.

75. The wide-field microscope of claim 1, wherein the excitation light source and the infinity corrected objective are configured to cause substantially homogeneous pulse spreading characteristics of the excitation light across the excitation light area when the excitation light passes therethrough such that light incident on the specimen has homogeneous pulse spreading characteristics.

* * * * *